(12) United States Patent
Gunter

(10) Patent No.: US 7,275,460 B2
(45) Date of Patent: Oct. 2, 2007

(54) ROTARY INDEXING MACHINE FOR USE IN A GROUP OF TREATMENT STATIONS

(75) Inventor: Albert Gunter, Plauen (DE)

(73) Assignee: WEMA Vogtland GmbH, Plauen (DE)

( * ) Notice: Subject to any disclaimer, the term of this patent is extended or adjusted under 35 U.S.C. 154(b) by 215 days.

(21) Appl. No.: 10/416,104

(22) PCT Filed: Dec. 1, 2001

(86) PCT No.: PCT/DE01/04517

§ 371 (c)(1),
(2), (4) Date: May 6, 2003

(87) PCT Pub. No.: WO02/45902

PCT Pub. Date: Jun. 13, 2002

(65) Prior Publication Data

US 2004/0040413 A1 Mar. 4, 2004

(30) Foreign Application Priority Data

Dec. 9, 2000 (DE) .............................. 100 61 524

(51) Int. Cl.
*B23Q 16/00* (2006.01)
*B23Q 16/02* (2006.01)
*B23Q 17/00* (2006.01)
*B23B 29/24* (2006.01)

(52) U.S. Cl. .................... 74/813 R; 74/813 L; 74/826; 198/346.1; 198/414

(58) Field of Classification Search .............. 74/813 R, 74/813 L, 826, 822; 82/117; 198/346.1, 198/414; 29/39, 33 P; *B23Q 16/00, 39/04*
See application file for complete search history.

(56) References Cited

U.S. PATENT DOCUMENTS

| 3,889,555 | A | | 6/1975 | Frank et al. |
| 4,015,487 | A | * | 4/1977 | Pfister ...................... 74/813 L |
| 4,184,691 | A | * | 1/1980 | Esser et al. .................... 279/5 |
| 4,244,247 | A | * | 1/1981 | Zaninelli ..................... 82/159 |
| 4,353,271 | A | * | 10/1982 | Pieczulewski ............... 74/826 |
| 4,637,108 | A | * | 1/1987 | Murata et al. .............. 29/33 P |
| 4,721,017 | A | * | 1/1988 | Jorgensen et al. ........ 74/813 L |
| 4,944,198 | A | * | 7/1990 | Natale et al. ............. 74/813 R |
| 5,133,538 | A | * | 7/1992 | Maeda et al. ............... 269/309 |
| 6,148,988 | A | | 11/2000 | Lin et al. |

(Continued)

FOREIGN PATENT DOCUMENTS

DE   23 08 984   6/1982

(Continued)

*Primary Examiner*—Vinh T. Luong
(74) *Attorney, Agent, or Firm*—Merchant & Gould P.C.

(57) ABSTRACT

A rotary indexing device for use in a group of treatment stations, includes at least one respective tensioning device for exchangeable tool holders disposed in a treatment zone. The rotary indexing machine has a rotary indexing unit with a lift-and-turn device on which support elements for tool holders are disposed. The lift-and-turn device of the rotary indexing unit is provided with a piston rod on which a first coupling element is mounted in a rotationally fixed manner. The first coupling element can be engaged with a further coupling element disposed above it by the lift stroke of the piston rod. The coupling element encloses the piston rod and is driven by a motor. The piston rod is rotationally fixed during the lift stroke.

10 Claims, 2 Drawing Sheets

U.S. PATENT DOCUMENTS 6,722,236 B1 * 4/2004 Baldini et al. ................. 82/117
2003/0046799 A1 * 3/2003 Matsumoto .................... 29/39

FOREIGN PATENT DOCUMENTS

| DE | 293 298 A | 8/1991 |
| DE | G 93 20 655 | 7/1994 |
| DE | 196 20 449 A1 | 11/1997 |
| GB | 1 494 173 | 12/1977 |
| GB | 2 072 788 A * | 10/1981 |
| SU | 1 303 377 A | 4/1987 |
| SU | XP002195865 | 4/1987 |

* cited by examiner

ROTARY INDEXING MACHINE FOR USE IN A GROUP OF TREATMENT STATIONS

BACKGROUND OF THE INVENTION

1. Field of the Invention

The invention relates to a rotary indexing machine for use in a group of machining stations, in whose machining zones is arranged in each case at least one tensioning device for exchangeable tool holders. Such a rotary indexing machine is described in the German Patent Specification DD 293 298 and in essence comprises a rotary indexing unit provided with a lift-and-turn device, on which are arranged support elements that are suitable for accepting the tool holders. The lift-and-turn device is designed such that, in each case, it can grasp under several tool holders when it is moved from a lowered position into a raised position. As soon as the tool holders have been lifted from their machining positions, a turning process of the turning device is begun, in order to bring the tool holders to their new machining positions. A subsequent set-down process then places the tool holders again onto the rotary indexing machines, which are provided with a tensioning device that works in conjunction with the workpiece holder, in order to fix the workpiece for the subsequent treatment process by machine.

2. Description of the Prior Art

The lift-and-turn device of the rotary indexing unit includes a piston rod; in the prior art, connected to the piston rod is a gearing that works in conjunction with a hydraulic cylinder in order to carry out the turning movement. Such a drive system is complex, since gearing and drive components must follow the lifting movement, which leads to an increase of the moved mass.

SUMMARY OF THE INVENTION

The invention is based on the task of further developing a rotary indexing machine having the features of the preamble of claim 1 such that the possibility exists of achieving in a simple manner an automatic rotational releasing, coupling, or rotational fixing of the rotary indexing machine in each case according to the vertical displacement position of the piston rod. This task is accomplished through the characterizing features of claim 1 and advantageous further developments result from the dependent claims 2-15.

Achieved through the characterizing features of claim 1 is, first of all, the fact that the lifting movement of the piston rod is, at the same time, the coupling movement through which the two superimposed, especially disc-like coupling elements are brought into engagement with each other. Thus, the lifting movement of the piston rod attains a double function and therefore additional, possibly motor-driven movement processes can be eliminated.

In the lower position as well as during the lifting movement, the piston rod is rotationally fixed, so that a motorized follow-up of the turning movement during the set-down process of the workpiece support onto the tensioning device is not necessary. Advantageously, during the lifting movement at least one radially-outer projection of the coupling element or of the piston rod engages a locationally-fixedly attached guide element that prevents uncontrolled twisting movements of the lift-and-turn device. However, as soon as the two coupling elements engage each other, the guide projection lies outside the at least one guide element and thus allows a twisting movement, which can be initiated through the coupling components engaging each other.

With particular advantage, a direct drive motor can be used for the rotational drive of the lift-and-turn device. Such a direct drive motor can be arranged with its essential elements being coaxial around the center of the rotary indexing machine, so that the space available inside the rotary indexing table is evenly filled. Moreover, the use of a direct drive motor with a relatively large radius enables the generation of higher torques and thus relatively higher indexing speeds upon the moving of the pallet supports.

The arrangement of the direct drive motor around the central longitudinal axis of the lift-and-turn device has the additional advantage that the bulk of the moved masses is moved around the central longitudinal axis in a balanced manner, whereby a vibration-free operation of the rotary indexing machine is achieved. The rotor of the direct drive motor carries directly the upper coupling element, so that additional gearing elements can be eliminated.

The lower end of the piston rod, in its sunken position, dips into a pot-like lower housing section, which, in addition to a conventional protective function, also performs a guiding function, in that the locationally-fixed guide element is integrated into the lower section. In addition, it is possible to accommodate a linear measurement system in the lower housing section, which system works in conjunction with the piston rod and precisely determines the latter's vertical displacement.

BRIEF DESCRIPTION OF THE DRAWINGS

The invention is further explained with the aid of an embodiment example illustrated in the drawings. These show.

DETAILED DESCRIPTION OF THE PREFERRED EMBODIMENT

Figure 1:
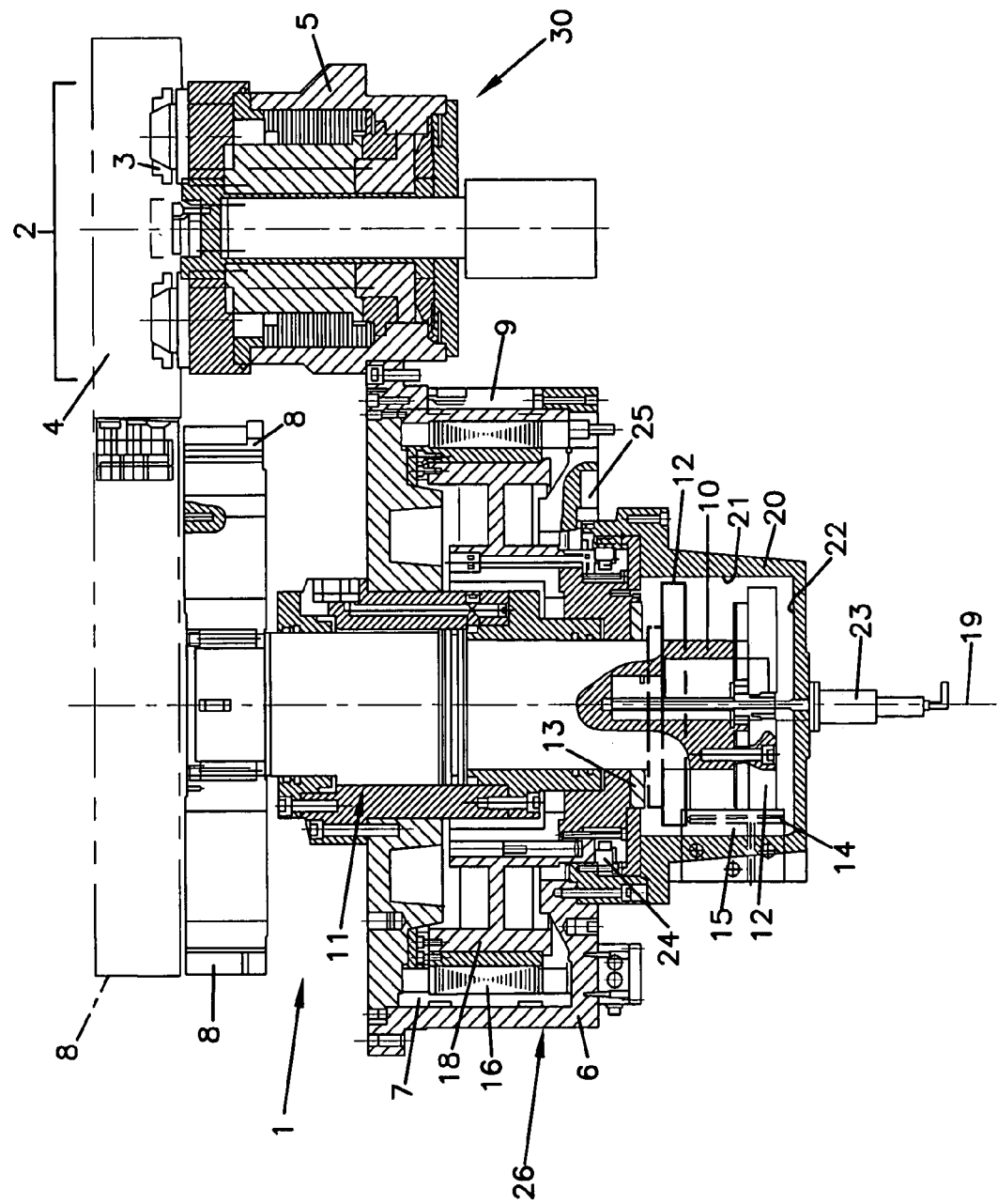
FIG. 1: a schematic (partial) sectional representation of the rotary indexing machine
Figure 2:
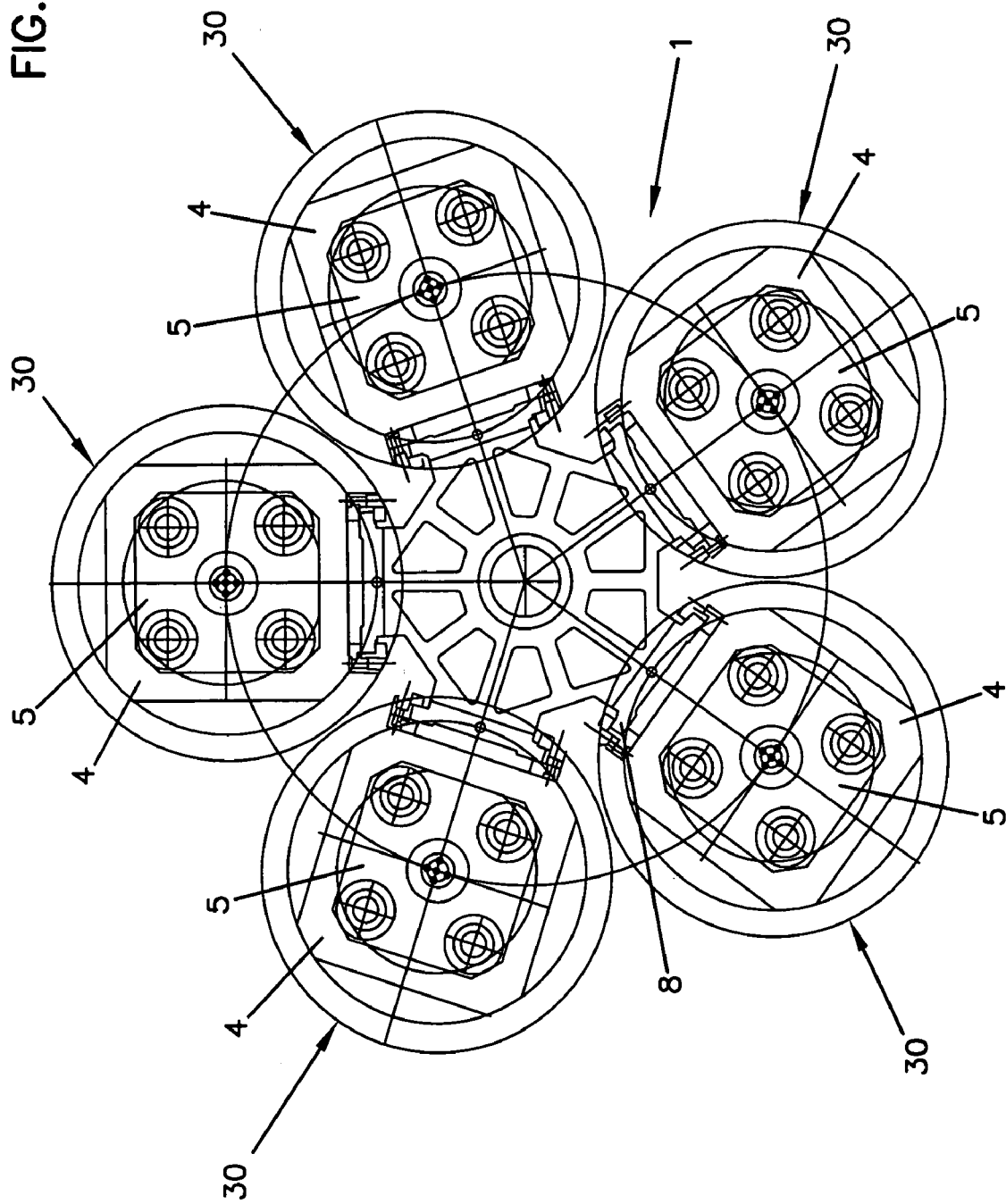
FIG. 2: a schematic plan view of the rotary indexing machine according to FIG. 1 having five rotary indexing tables

The rotary indexing machine 1 according to the invention finds application especially in association with machining stations 30 for machine tools, in the machining zones 2 of which stations are arranged tensioning devices 3 for exchangeable tool holders 4. The tensioning devices 3 are mounted on rotary indexing tables 5 that can be arranged either on the housing 6 of the rotary indexing machine 1 or separately. The rotary indexing machine 1 is further provided with a rotary indexing unit 9 that carries a lift-and-turn device 7 having radially-protruding support elements 8 for accepting the workpiece holders 4.

The rotary indexing unit 9 further includes a piston rod 10 that is seated in a lifting-cylinder arrangement 11 in a tilt-stable manner. Attached to the upper end of the piston rod 10 are the holder elements 8, and at the lower end of the piston rod 10 a first coupling element 12 is arranged in a rotationally-fixed manner, which coupling element can, through the lifting movement of the piston rod 10, be engaged with an upper coupling element 13 situated above. Both coupling elements are designed essentially as discs, and the upper coupling element surrounds the piston rod 10 and is motor-driven. During the lifting movement the piston rod 10 slides through the other coupling element 13 until the two disc-shaped coupling elements 12, 13 lie against each other.

The piston rod 10 and the support elements 8 are rotationally fixed in the lowered position and during the lifting movement of the piston rod 10, so that the workpiece holders 4 can be placed onto the tensioning devices 3 with high precision. The rotational fixing is ensured in that during the lifting movement of the piston rod 10 a radially-outer projection 14 on the piston rod 10 or on the coupling of a coupling support engages at least one locationally-fixed guide element in the form of a vertically-running guide groove 15. When the upper coupling-engagement position of the two coupling elements 12, 13 is reached, the projection 14 leaves the guide groove 15, so that the piston rod 10 and the support elements 8 can be rotationally driven.

Provided for this purpose is a direct drive motor 16, the essential elements of which, the stator 17 and the rotor 18, are arranged coaxially around the lift-and-turn device 7. The rotor 18 of the direct drive motor 16 here rotates around the central longitudinal axis 19 of the lift-and-turn device 7 and directly supports the other (upper) coupling element 13.

The rotor 18 is supported in a tilt-stable manner with its lower region in an axial-radial bearing 25. Since the piston rod 10 is guided with its lower region inside the rotor 18, the rotary indexing machine is suitable for lifting heavy and, in particular, unevenly distributed loads.

The lower end of the piston rod 10, in the lowered position, dips into a pot-like lower housing section 20, on the inner side 21 of which is arranged the guide element in the form of the guide groove 15.

Arranged in the bottom 22 of the lower housing section 20 is a linear measurement system 23 that works in conjunction with the piston rod 10 and, in association with a machine control, is suitable for regulating the lifting movement of the piston rod in a path-dependent and speed-dependent manner. Also provided in the rotation region of the rotor 18 is a measurement system 24 by means of which the rotational movement of the lift-and-turn device 7 can be determined.

The lift-and-turn device 7 as well as the direct drive motor 16 with its essentially elements are arranged in a machine housing, to which the rotary indexing tables 5 are peripherally attached. However, in an alternative embodiment the rotary indexing tables 5 can be arranged separately and thus, for the most part, mechanically uncoupled from the rotary indexing tables 5.

The tensioning devices 3 fastened to the rotary indexing tables 5 for the pallets are controllable synchronously with the lifting movement of the lift-and-turn device 7, provided for which purpose is the electronic machine control (not illustrated) that controls the hydraulic elements of the lift-and-turn device 7, the direct drive motor 16, and the tensioning devices 3.

The invention claimed is:

1. Rotary indexing machine for use in a group of machining stations, in whose machining zones is arranged at least one tensioning device for exchangeable tool holders, the rotary indexing machine including a rotary indexing unit provided with a lift-and-turn device, to which support elements for accepting the tool holders are attached, the lift-and-turn device of the rotary indexing unit being provided with a piston rod and a first coupling element, wherein during lifting movement, the piston rod is rotationally fixed and at least one radial outer projection of the first coupling element engages at least one guide element that is attached in a locationally-fixed manner, and wherein the first coupling element is rotationally fixed to the piston rod and through the lifting movement of the piston rod is configured for engaging an additional coupling element surrounding the piston rod and situated above the first coupling element.

2. Rotary indexing machine according to claim 1, wherein a rotor of a direct drive motor rotates around a central longitudinal axis of the lift-and-turn device.

3. Rotary indexing machine according to claim 2, wherein the rotor of the direct drive motor rotates around the central longitudinal axis of the lift-and-turn device.

4. Rotary indexing machine according to claim 2, wherein provided in the rotation region of the rotor is a measurement system that determines the rotational movement of the lift-and-turn device.

5. Rotary indexing machine according to claim 2, wherein the lift-and-turn device and the direct drive motor are arranged in a machine housing to which rotary indexing tables are peripherally attached.

6. Rotary indexing machine according to claim 5, wherein tensioning devices are attached to the rotary indexing tables and are controllable synchronously with the lift-and-turn device.

7. Rotary indexing machine according to claim 1, wherein a rotor of a direct drive motor supports the additional coupling element.

8. Rotary indexing machine according to claim 1, wherein tensioning devices are attached to the rotary indexing tables and are controllable synchronously with the lift-and-turn device.

9. Rotary indexing machine for use in a group of machining stations, in whose machining zones is arranged at least one tensioning device for exchangeable tool holders, the rotary indexing machine displaying a rotary indexing unit that is provided with a lift-and-turn device, to which support elements for accepting the tool holders are attached, the lift-and-turn device of the rotary indexing unit being provided with a piston rod, wherein on the piston rod, which is rotationally fixed during the lifting movement, is arranged in a rotationally fixed manner a first coupling element that through the lifting movement of the piston rod is brought into engagement with an additional coupling element situated above the first coupling element, the additional coupling element situated above the first coupling element surrounds the piston rod and wherein through the lifting movement at least one radial outer projection of the coupling element or of the piston rod engages at least one guide element that is attached in a locationally-fixed manner.

10. Rotary indexing machine for use in a group of machining stations, in whose machining zones is arranged at least one tensioning device for exchangeable tool holders, the rotary indexing machine including a rotary indexing unit provided with a lift-and-turn device, to which support elements for accepting the tool holders are attached, the lift-and-turn device of the rotary indexing unit being provided with a piston rod, wherein during lifting movement, the piston rod is rotationally fixed and at least one radial outer projection of a first coupling element engages at least one guide element that is attached in a locationally-fixed manner, and wherein the first coupling element is rotationally fixed to the piston rod and through the lifting movement of the piston rod is configured for engaging an additional coupling element surrounding the piston rod and situated above the first coupling element, a drive motor for rotational driving of the lift-and-turn device.

* * * * *